(12) United States Patent
Kim et al.

(10) Patent No.: US 8,789,417 B2
(45) Date of Patent: Jul. 29, 2014

(54) INERTIAL SENSOR AND ANGULAR VELOCITY DETECTION METHOD USING THE SAME

(75) Inventors: Jong Woon Kim, Seoul (KR); Heung Woo Park, Gyunggi-do (KR); Won Kyu Jeung, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 225 days.

(21) Appl. No.: 13/303,334

(22) Filed: Nov. 23, 2011

(65) Prior Publication Data
US 2013/0019679 A1 Jan. 24, 2013

(30) Foreign Application Priority Data
Jul. 18, 2011 (KR) .................. 10-2011-0070965

(51) Int. Cl.
*G01C 19/56* (2012.01)
(52) U.S. Cl.
USPC ..................................... 73/504.12

(58) Field of Classification Search
USPC ........................................ 73/504.12
See application file for complete search history.

(56) References Cited

U.S. PATENT DOCUMENTS
5,646,346 A * 7/1997 Okada ................. 73/504.04

FOREIGN PATENT DOCUMENTS
JP 2009-192400 * 8/2009

* cited by examiner

*Primary Examiner* — John Chapman, Jr.
(74) *Attorney, Agent, or Firm* — Ladas & Parry, LLP

(57) ABSTRACT

Disclosed herein is an inertial sensor including: a driving part displaceably supported by a support; a driving electrode vibrating the driving part; and a detecting electrode detecting a force acting on the driving part in a predetermined direction, wherein the driving part includes: a center driving mass positioned at the center of the inertial sensor; side driving masses connected to and interlocking with the center driving mass and positioned at four sides based on the center driving mass; and connection bridges connecting the center driving mass, the side driving masses, and the support to each other.

10 Claims, 5 Drawing Sheets

INERTIAL SENSOR AND ANGULAR VELOCITY DETECTION METHOD USING THE SAME

CROSS REFERENCE TO RELATED APPLICATION

This application claims the benefit of Korean Patent Application No. 10-2011-0070965, filed on Jul. 18, 2011, entitled "Inertial Sensor And Angular Velocity Detection Method Using The Same", which is hereby incorporated by reference in its entirety into this application.

BACKGROUND OF THE INVENTION

1. Technical Field

The present invention relates to an inertial sensor and an angular velocity detection method using the same.

2. Description of the Related Art

Recently, as a small and light inertial sensor is easily manufactured using an MEMS technology, application fields of the inertial sensor have been expanded to home appliances including a mobile communication terminal beyond the existing market. Therefore, in accordance with the continuous development of functions of the inertial sensor, the function of the inertial sensor is being continuously developed from a uniaxial sensor capable of detecting only an inertial force for a single axis using a single sensor to a multi-axis sensor capable of detecting an inertia force for a multi-axis of two axes or more using a single sensor.

As described above, in order to implement a six-axis sensor detecting the multi-axis inertial forces, that is, three-axis acceleration and three-axis angular velocities using a single sensor, accurate and effective time division driving and control are required.

Further, in the case of the inertial sensor according to the prior art, in order to detect three-axis angular velocities using a single driving mass, driving in X/Y axis directions and driving in a Z axis direction are sequentially performed in a time division scheme and an angular velocity in a Z axis direction, and angular velocities in X and Y axis directions are sequentially detected.

Since the time division scheme is used in order to detect the three-axis angular velocities using a single inertial sensor, an output data rate (ODR) for driving and sensing for a predetermined time is required, a driving circuit is significantly complicated, and additional current consumption for stopping and re-driving is required.

SUMMARY OF THE INVENTION

The present invention has been made in an effort to provide an inertial sensor in which a center driving mass and side driving masses connected to the center driving mass are provided as a driving mass thereof, and the side driving masses interlock with the center driving mass in another direction of three axes at the time of driving of the center driving mass in one direction of the three axes, such that three-axis angular velocities may be detected without performing time division driving, and an angular velocity detection method using the same.

According to a first preferred embodiment of the present invention, there is provided an inertial sensor including: a driving part displaceably supported by a support; a driving electrode vibrating the driving part; and a detecting electrode detecting a force acting on the driving part in a predetermined direction, wherein the driving part includes: a center driving mass positioned at the center of the inertial sensor; side driving masses connected to and interlocking with the center driving mass and positioned at four sides based on the center driving mass; and connection bridges connecting the center driving mass, the side driving masses, and the support to each other.

The connection bridge may include: a driving bridge connecting the center driving mass to the support; a coupling bridge connecting the center driving mass to the side driving mass; and a sensing bridge connecting the side driving mass to the support.

The driving bridge may have a width larger than that of the sensing bridge.

The driving bridge may include a driving electrode and a sensing electrode formed therein, and The sensing bridge may include a sensing electrode formed therein.

Four side driving masses may be provided symmetrically to each other at four sides based on the center driving mass, having equidistance therebetween.

Each of the side driving masses may be provided at both sides based on the center driving mass, having equidistance therebetween.

The center driving mass may have a size larger than those of the side driving masses.

According to a second preferred embodiment of the present invention, there is provided an inertial sensor including: a driving part displaceably supported by a support; a driving electrode vibrating the driving part; and a detecting electrode detecting a force acting on the driving part in a predetermined direction, wherein the driving part includes: a center driving mass positioned at the center of the inertial sensor; side driving masses connected to and interlocking with the center driving mass and positioned at four sides based on the center driving mass; and connection bridges connecting the center driving mass, the side driving masses, and the support to each other, and wherein the connection bridge includes a driving bridge sequentially connecting the center driving mass and the side driving mass to the support and a sensing bridge connecting the side driving mass to the support.

According to a third preferred embodiment of the present invention, there is provided an angular velocity detection method using the inertial sensor as set forth above, the angular velocity detection method including: a center driving mass driving step of vibrating a center driving mass in a Z axis direction; a side driving mass driving step of allowing side driving masses to interlock with the center driving mass in X/Y axis directions; a center driving mass angular velocity detecting step of detecting X axis and Y axis angular velocities by the driving of the center driving mass; and a side driving mass angular velocity detecting step of detecting a Z axis angular velocity by the driving of the side driving masses.

In the center driving mass angular velocity detecting step, the X axis and Y axis angular velocities may be detected in a detecting electrode of a driving bridge connected to the center driving mass.

In the side driving mass angular velocity detecting step, the Z axis angular velocity may be detected in a detecting electrode of a sensing bridge connected to the side driving mass.

DESCRIPTION OF THE PREFERRED EMBODIMENTS

Figure 1:
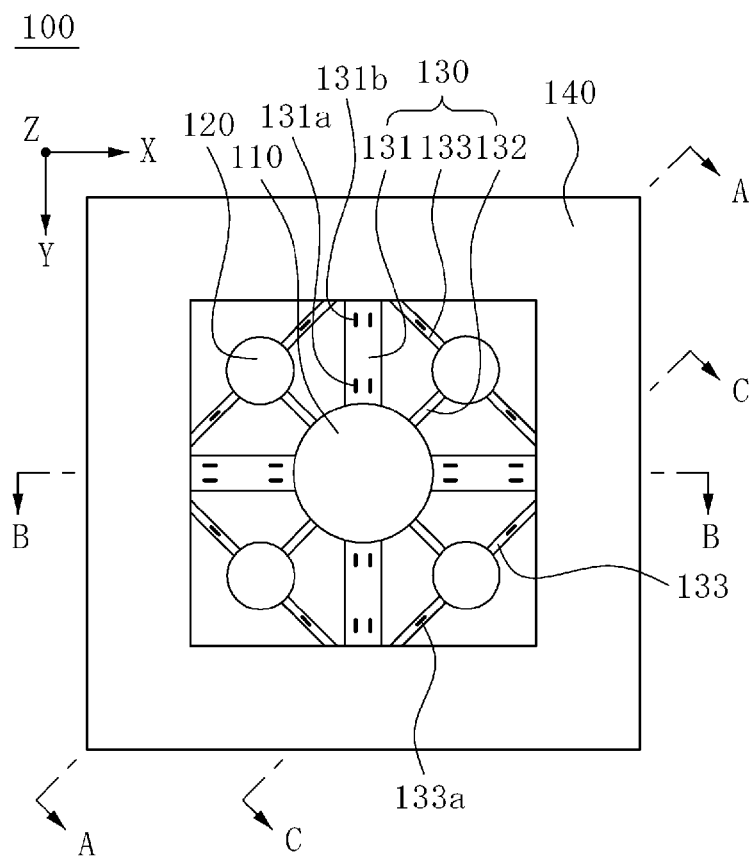
FIG. 1 is a schematic configuration view of an inertial sensor according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, an inertial sensor according to preferred embodiments of the present invention will be described with reference to the accompanying drawings.

Figure 2:
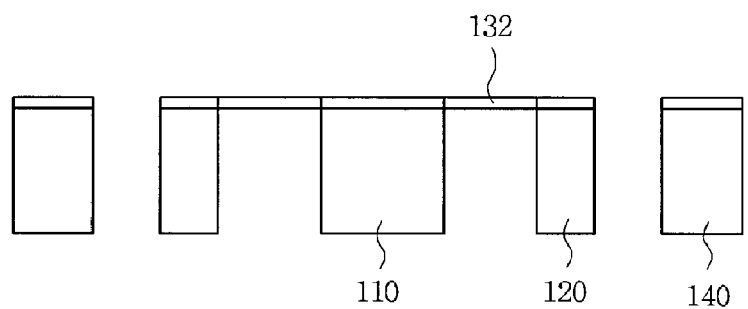
FIG. 2 is a schematic cross-sectional view of the inertial sensor shown in FIG. 1.

FIG. 1 is a schematic configuration view of an inertial sensor according to a first preferred embodiment of the present invention; and FIG. 2 is a schematic cross-sectional view, and more specifically, a cross-sectional view taken along the line A-A', of the inertial sensor shown in FIG. 1. The present invention relates to an inertial sensor including a driving part displaceably supported by a support, a driving electrode vibrating the driving part, and a detecting electrode detecting a force acting on the driving part in a predetermined direction. As shown, the inertial sensor 100 includes a center driving mass 110, side driving masses 120, connection bridges 130, and a support 140.

More specifically, the center driving mass 110 is positioned at the center of the inertial sensor and is driven by a driving electrode (131b). Movement of the center driving mass 110 is sensed by a sensing electrode (131a), such that an inertial force is detected.

The side driving masses 120 are connected to the center driving mass 100 by the connection bridges 130, and interlock with the movement of the center driving mass 110 to thereby drive in a direction different from a movement direction of the center driving mass 110. In addition, the inertial sensor 100 according to the first preferred embodiment of the present invention includes four side driving masses 120 positioned symmetrically to each other at four sides based on the center driving mass 110, having equidistance therebetween.

To this end, the connection bridge 130 includes a driving bridge 131, a coupling bridge 132, and a sensing bridge 133. The driving bridge 131 connects the center driving mass 110 to the support 140 and includes a driving electrode (131b) and a sensing electrode (131a) formed therein. The coupling bridge 132 connects the center driving mass 110 to the side driving mass 120. The sensing bridge 133 connects the side driving mass 120 to the support 140 and includes a sensing electrode (133a) formed therein.

The support 140 supports the center driving mass 110, the side driving masses 120, and the connection bridges 130, and supports the center driving mass 110 and the side driving masses 120 so as to freely move in a state in which the center driving mass 110 and the side driving masses 120 are floated.

In addition, the center driving mass 110 of the inertial sensor 100 according to the preferred embodiment of the present invention has a size larger than those of the side driving masses 120. This was designed in order to allow the side driving masses 120 to smoothly interlock with driving of the center driving mass 110.

Since the connection bridge 130 is formed of a silicon on insulator (SOI) substrate, all of the driving bridge 131, the coupling bridge 132, and the sensing bridge 133 have the same thickness. Further, as shown, in the connection bridge 130, the driving bridge 131 has a width larger than that of the sensing bridge 133. This was designed in consideration of electrodes formed in the respective bridges and their roles and effects.

Figure 3:
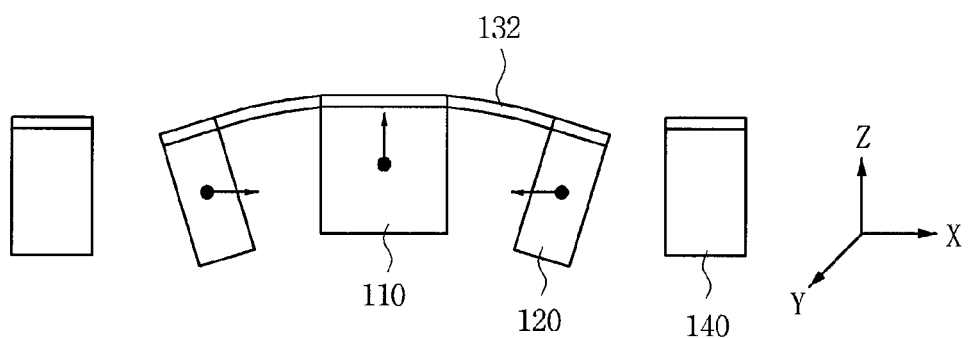
FIG. 3 is a cross-sectional view taken along the line A-A' for a usage state of the inertial sensor shown in FIG. 1.
Figure 4:
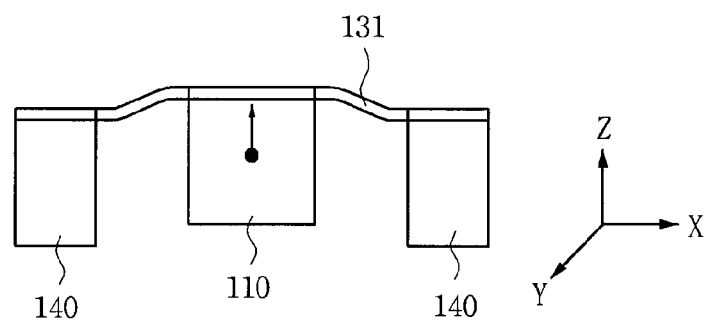
FIG. 4 is a cross-sectional view taken along the line B-B' for a usage state of the inertial sensor shown in FIG. 1.
Figure 5:
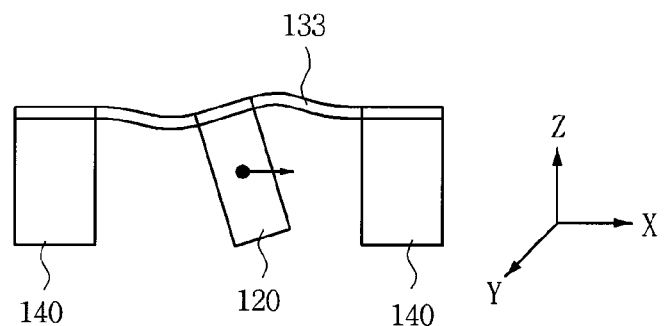
FIG. 5 is a cross-sectional view taken along the line C-C' for a usage state of the inertial sensor shown in FIG. 1.

FIG. 3 is a cross-sectional view taken along the line A-A' for a usage state of the inertial sensor shown in FIG. 1; FIG. 4 is a cross-sectional view taken along the line B-B' for a usage state of the inertial sensor shown in FIG. 1; FIG. 5 is a cross-sectional view taken along the line C-C' for a usage state of the inertial sensor shown in FIG. 1; and FIG. 6 is a flow chart schematically showing an angular velocity detection method using the inertial sensor shown in FIG. 1.

More specifically, as shown in FIG. 3, when the center driving mass 110 is vibrated in an upward direction, that is, in a Z axis direction as shown in an arrow, four side driving masses 120 connected to four sides based on the center driving mass 110 interlocks with the center driving mass 110 by the coupling bridges 132 to thereby be vibrated in X/Y axis directions.

Figure 6:
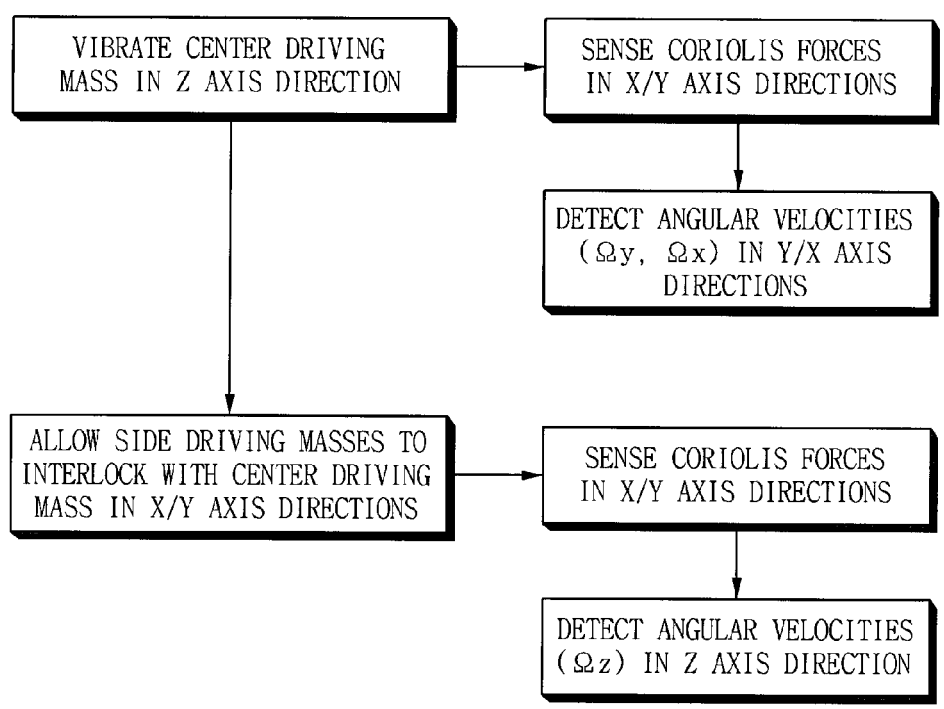
FIG. 6 is a flow chart schematically showing an angular velocity detection method using the inertial sensor shown in FIG. 1.

In this case, as shown in FIG. 6, when the center driving mass 110 is vibrated in the Z axis direction, Coriolis forces in X/Y axis directions applied to the center driving mass 110 are sensed by the sensing electrode (131a) formed in the driving bridge 131, and angular velocities $\Omega y$ and $\Omega x$ in Y/X axis directions are detected through the sensed Coriolis forces in X/Y axis directions. In addition, the side driving masses 120 interlocks with the center driving mass 110 to thereby be vibrated in the X/Y axis directions, the Coriolis forces in X/Y axis directions applied to the side driving masses 120 are sensed by the sensing electrode (133a) formed in the sensing bridge 133, and an angular velocity $\Omega z$ in a Z axis direction is detected through the sum of the values sensed in the respective sensing electrodes.

As a result, when the center driving mass 110 is vibrated in the Z axis direction, the side driving masses 120 interlock with the center driving mass 110 in the X/Y axis directions, thereby making it possible to detect angular velocities $\Omega z$, $\Omega y$, and $\Omega x$ in Z, Y, and X axis directions without performing time division driving in order to drive each axis.

Figure 7:
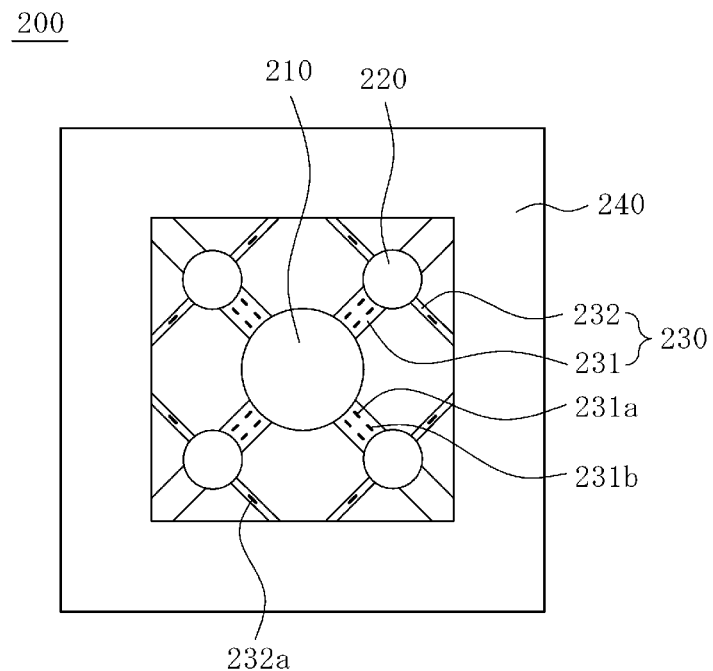
FIG. 7 is a schematic configuration view of an inertial sensor according to a second preferred embodiment of the present invention.

FIG. 7 is a schematic configuration view of an inertial sensor according to a second preferred embodiment of the present invention. As shown, an inertial sensor 200 includes a center driving mass 210, side driving masses 220, connection bridges 230, and a support 240, and is different only in the connection bridges 230 from the inertial sensor 100 according to the first preferred embodiment of the present invention shown in FIG. 1.

More specifically, the connection bridge 230 includes a driving/coupling bridge 231 and a sensing bridge 232. The driving/coupling bridge 231 sequentially connects the center driving mass 110 and the side driving mass 220 to the support 240 and includes a driving electrode (231b) and a sensing electrode (231a) formed therein.

The sensing bridge 232 connects the side driving mass 220 to the support 240 and includes a sensing electrode (232a) formed therein.

Therefore, in the same scheme as that of the inertial sensor according to the first preferred embodiment of the present invention shown in FIG. 1, the side driving masses 220 interlock with the center driving mass 210 according to vibration of the center driving mass 210, thereby making it possible to detect angular velocities $\Omega h$, $\Omega y$, and $\Omega x$ in Z, Y, and X axis directions without performing time division driving.

Figure 8:
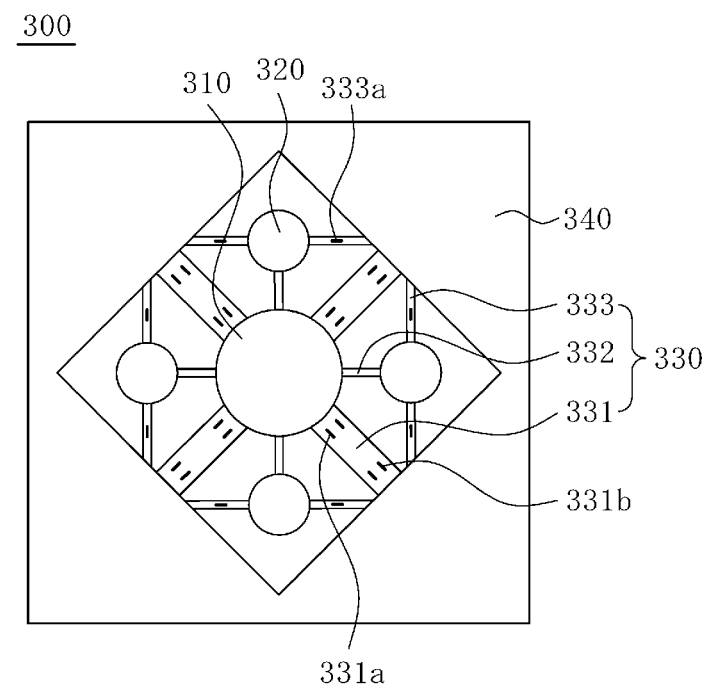
FIG. 8 is a schematic configuration view of an inertial sensor according to a third preferred embodiment of the present invention.

FIG. 8 is a schematic configuration view of an inertial sensor according to a third preferred embodiment of the present invention. As shown, an inertial sensor 300 includes a center driving mass 310, side driving masses 320, connection bridges 330, and a support 340, and is different only in directions of the connection bridges connected to the support 340 and positions of the side driving masses 320 connected to the center driving mass 310 from the inertial sensor 100 according to the first preferred embodiment of the present invention shown in FIG. 1.

In addition, the connection bridge 330 includes a driving bridge 331, a coupling bridge 332, and a sensing bridge 333. The driving bridge 331 connects the center driving mass 310 to the support 340 and includes a driving electrode (331b) and a sensing electrode (331a) formed therein. The coupling bridge 332 connects the center driving mass 310 to the side driving mass 320. The sensing bridge 333 connects the side driving mass 320 to the support 340 and includes a sensing electrode (333a) formed therein.

Therefore, in the same scheme as that of the inertial sensor according to the first preferred embodiment of the present invention shown in FIG. 1, the side driving masses 320 interlock with the center driving mass 310 according to vibration of the center driving mass 310, thereby making it possible to detect angular velocities $\Omega z$, $\Omega y$, and $\Omega x$ in Z, Y, and X axis directions without performing time division driving.

Figure 9:
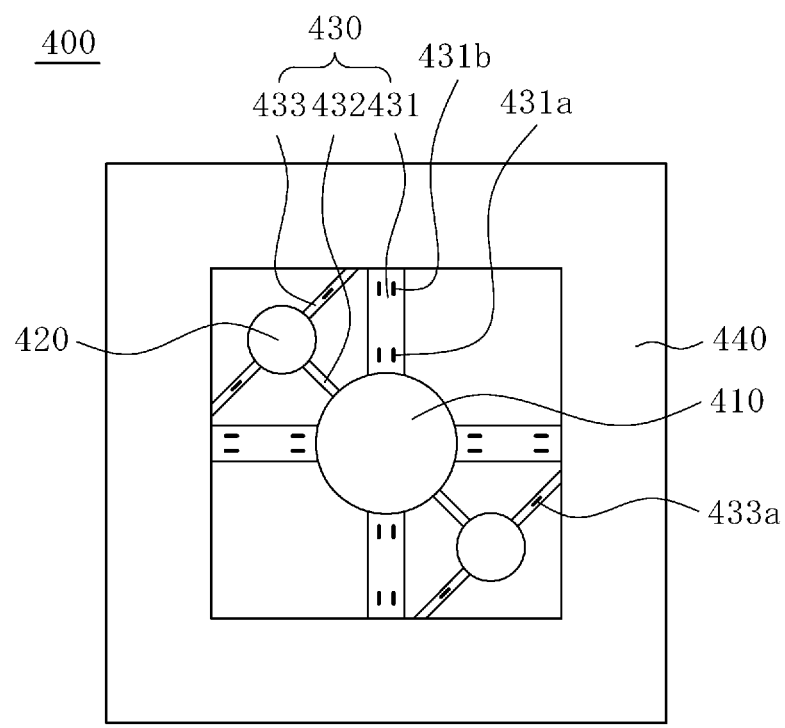
FIG. 9 is a schematic configuration view of an inertial sensor according to a fourth preferred embodiment of the present invention.

FIG. 9 is a schematic configuration view of an inertial sensor according to a fourth preferred embodiment of the present invention. As shown, an inertial sensor 400 includes a center driving mass 410, side driving masses 420, connection bridges 430, and a support 440, and is different only in the number of side driving masses 420 connected to the center driving mass 410 from the inertial sensor 100 according to the first preferred embodiment of the present invention shown in FIG. 1.

More specifically, each of side driving masses 420 is positioned at both sides based on the center driving mass 410 and is connected to the center driving mass 410 by the connection bridges 430.

In addition, the connection bridge 430 includes a driving bridge 431, a coupling bridge 432, and a sensing bridge 433. The driving bridge 431 connects the center driving mass 410 to the support 440 and includes a driving electrode (431b) and a sensing electrode (431a) formed therein. The coupling bridge 432 connects the center driving mass 410 to the side driving mass 420. The sensing bridge 433 connects the side driving mass 420 to the support 440 and includes a sensing electrode (433a) formed therein.

Therefore, in the same scheme as that of the inertial sensor according to the first preferred embodiment of the present invention shown in FIG. 1, the side driving masses 420 interlock with the center driving mass 410 according to vibration of the center driving mass 410, thereby making it possible to detect angular velocities $\Omega z$, $\Omega y$, and $\Omega x$ in Z, Y, and X axis directions without performing time division driving.

As set forth above, according to the preferred embodiment of the present invention, it is possible to provide the inertial sensor in which the center driving mass and the side driving masses connected to the center driving mass are provided as the driving mass thereof, and the side driving masses interlock with the center driving mass in another direction of three axes at the time of driving of the center driving mass in one direction of the three axes, such that the three-axis angular velocities may be detected without performing the time division driving, and an angular velocity detection method using the same.

Although the preferred embodiments of the present invention have been disclosed for illustrative purposes, they are for specifically explaining the present invention and thus an inertial sensor and an angular velocity detection method using the same according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:
1. An inertial sensor comprising:
a driving part displaceably supported by a support;
a driving electrode vibrating the driving part; and
a detecting electrode detecting a force acting on the driving part in a predetermined direction,
wherein the driving part includes: a center driving mass positioned at the center of the inertial sensor;
side driving masses connected to and interlocking with the center driving mass and positioned at four sides based on the center driving mass; and
connection bridges connecting the center driving mass, the side driving masses, and the support to each other,
wherein the connection bridges comprise:
a driving bridge connecting the center driving mass to the support;
a coupling bridge connecting the center driving mass to each side driving mass; and
a sensing bridge connecting each side driving mass to the support.
2. The inertial sensor as set forth in claim 1, wherein the driving bridge has a width larger than that of the sensing bridges.

3. The inertial sensor as set forth in claim 1, wherein the driving bridge includes the driving electrode and the sensing electrode formed therein, and the sensing bridge includes a sensing electrode formed therein.

4. The inertial sensor as set forth in claim 1, wherein four side driving masses are provided symmetrically to each other at four sides based on the center driving mass, having equidistance therebetween.

5. The inertial sensor as set forth in claim 1, wherein the side driving masses are provided at both sides based on the center driving mass, having equidistance therebetween.

6. The inertial sensor as set forth in claim 1, wherein the center driving mass has a size larger than those of the side driving masses.

7. An inertial sensor comprising:
a driving part displaceably supported by a support;
a driving electrode vibrating the driving part; and
a detecting electrode detecting a force acting on the driving part in a predetermined direction,
wherein the driving part includes:
  a center driving mass positioned at the center of the inertial sensor;
  side driving masses connected to and interlocking with the center driving mass and positioned at four sides based on the center driving mass; and
  connection bridges connecting the center driving mass, the side driving masses, and the support to each other, and
wherein the connection bridges include a driving bridge sequentially connecting the center driving mass and the side driving mass to the support and a sensing bridge connecting each side driving mass to the support.

8. An angular velocity detection method using the inertial sensor as set forth in claim 1, the angular velocity detection method comprising:
a center driving mass driving step of vibrating a center driving mass in a Z axis direction;
a side driving mass driving step of allowing side driving masses to interlock with the center driving mass in X/Y axis directions;
a center driving mass angular velocity detecting step of detecting X axis and Y axis angular velocities by the vibration of the center driving mass; and
a side driving mass angular velocity detecting step of detecting a Z axis angular velocity by Coriolis forces in X/Y axis directions applied to the side driving masses.

9. The angular velocity detection method as set forth in claim 8, wherein in the center driving mass angular velocity detecting step, the X axis and Y axis angular velocities are detected in a detecting electrode of a driving bridge connected to the center driving mass.

10. The angular velocity detection method as set forth in claim 8, wherein in the side driving mass angular velocity detecting step, the Z axis angular velocity is detected in a detecting electrode of a sensing bridge connected to each side driving mass.

* * * * *